United States Patent [19]

Ueda et al.

[11] 4,140,380
[45] Feb. 20, 1979

[54] EXPOSURE INDICATING DEVICES FOR SINGLE REFLEX CAMERAS

[75] Inventors: Hiroshi Ueda, Nara; Kunio Kawamura; Keiji Yamazaki, both of Sakai, all of Japan

[73] Assignee: Minolta Camera Kabushiki Kaisha, Osaka, Japan

[21] Appl. No.: 804,290

[22] Filed: Jun. 7, 1977

[30] Foreign Application Priority Data

Jun. 14, 1976 [JP] Japan .................................. 51-68740

[51] Int. Cl.² ........................................... G03B 17/20
[52] U.S. Cl. ................................... 354/60 L; 354/53; 354/286; 354/289
[58] Field of Search .................... 354/28, 29, 38, 60 L, 354/286, 289, 53

[56] References Cited

U.S. PATENT DOCUMENTS

| | | | |
|---|---|---|---|
| 3,439,600 | 4/1969 | Suzuki | 354/286 |
| 3,829,867 | 8/1974 | Ono | 354/28 |
| 3,990,799 | 11/1976 | Nanba et al. | 354/60 L |
| 4,011,569 | 3/1977 | Mashimo et al. | 354/38 |
| 4,037,235 | 7/1977 | Ueda | 354/289 |

FOREIGN PATENT DOCUMENTS 1233037  5/1971  United Kingdom.

*Primary Examiner*—Russell E. Adams
*Attorney, Agent, or Firm*—Watson, Cole, Grindle & Watson

[57] ABSTRACT

An exposure indicating device for single lens reflex cameras which are selectively settable to automatic aperture control or automatic shutter speed control modes includes an exchangeable lens which has first and second information transmitting members, and a diaphragm setting member settable to one of a number of manually set aperture positions and to an automatic aperture control position. The first transmitting member transmits to a first information receiving member, first information of the step-difference from a minimum to a preset f-number of the lens independently of the set position of the diaphragm setting member. The second transmitting member transmits to a second information receiving member, second information of a maximum f-number only when the diaphragm setting member is set to the automatic aperture control position. The second transmitting member also serves as a mode selection and scale selection member which switches the camera into the automatic aperture control mode and enables observation of an aperture scale within a finder view field when the diaphragm setting member is set to the automatic aperture control position. The second transmitting member also switches the camera into the automatic shutter speed control mode and enables observation of a shutter speed scale within the finder view field when the diaphragm setting member is set to any one of the manually set aperture positions. The first information thus received enables automatic shutter speed control, and indication of an automatically controlled shutter speed prior to a stopping-down operation. The first and second information thus received are composed with each other, only in the automatic aperture control mode, to generate information of the minimum f-number of the lens, which enables indication of an f-number corresponding to an automatically controlled aperture prior to the stopping-down operation.

10 Claims, 7 Drawing Figures

EXPOSURE INDICATING DEVICES FOR SINGLE REFLEX CAMERAS

BACKGROUND OF THE INVENTION

This invention relates to exposure indicating devices for use in lens-exchangeable, single lens reflex cameras of the through-the-lens (TTL) light measurement type, which is applicable to any type of objective lens selected, and wherein, in any selected mode of automatic exposure control, the exposure factor values to be automatically controlled may be properly indicated prior to the commencement of the diaphragm aperture stopping-down operation.

U.S. Pat. No. 3,829,867 discloses two automatic exposure control modes, namely, the so-called shutter-speed-priority-automatic-diaphragm-control mode, and the so-called diaphragm-priority-automatic-shutter speed-control mode. In the former control mode, the diaphragm is stopped-down from an open position in association with the shutter release operation prior to the commencement of the movement of the shutter to an open position, while the intensity of light which has passed through an objective is measured and the diaphragm is in the process of being stopped-down. When a proper aperture value for a preselected shutter speed is determined as the result of the light measurement, the stopping-down operation of the diaphragm is interrupted. With the diaphragm maintained stopped-down at that aperture value, light measurement for shutter speed control is conducted, so that the shutter speed may be controlled according to the light measuring outputs. In the latter control mode the diaphragm is stopped-down to a preset aperture value in association with the shutter release operation, prior to the commencement of the movement of the shutter to an open position, and the light measurement at the aperture value to which the diaphragm has been stopped-down is conducted, so that the shutter speed is controlled according to the light measuring outputs so obtained.

Various attempts have been proposed for providing a camera capable of changing over the exposure control mode from the diaphragm-priority-automatic-shutter-speed-control mode to the shutter-speed-priority-automatic-diaphragm-control mode, and vice-versa, in a TTL light measuring single lens reflex camera equipped with an exposure indicating device. However, some of these cameras, particularly a camera with an exchangeable lens, fail to transmit sufficient information from the lens to the camera body to achieve a complete indication in each exposure control mode, thereby resulting in imperfect indications of the exposure factors. Stated differently, in the shutter-speed-priority-automatic-diaphragm-control mode, the difficulty arises with such a camera to indicate an f-number corresponding to an aperture value to be automatically controlled prior to the stopping-down operation.

Every exchangeable lens has an inherent minimum f-number. Thus, in order to compute the proper aperture value relative to a brightness value, the film sensitivity setting and a preselected shutter speed, and to indicate an f-number corresponding to the proper aperture value, the intrinsic minimum f-number of the exchangeable lens mounted on the camera, as well as other factors, need to be transmitted to the camera body. Moreover, the manufacturers or suppliers of a new type camera or lens should consider the exchangeability of a new camera or lens with an old type camera or lens which has been in the market for a long period of time to avoid supplying a new type camera body on which an old type lens cannot be mounted, or a new type lens which cannot be mounted on an old type camera.

The indication of an f-number corresponding to an aperture value to be controlled in the shutter-speed-priority-automatic-diaphragm-control mode poses a critical problem for camera manufacturers who have supplied a lens having only a transmitting member for transmitting information from the exchangeable lens to the camera body of the difference in the number of steps to be stopped-down from a minimum f-number to a preset f-number. Moreover, it is common that single lens reflex cameras as described above are provided with a mode selection member on the camera body for selecting either the automatic aperture control mode or the automatic shutter speed control mode.

SUMMARY OF THE INVENTION

It is a feature of the present invention to provide an exposure indicating device for a single lens reflex camera that is selectively settable either to an automatic aperture control mode or to an automatic shutter speed control mode, which device enables indication of an f-number corresponding to an automatically controlled aperture prior to a stopping-down operation. The exposure indicating device also provides indication of the automatically controlled shutter speed prior to the stopping-down operation, without changing the information transmitting system for transmitting information to the camera of the step-difference from a minimum to a set f-number. An operating member for selecting either of the automatic exposure control modes is provided on the side of an exchangeable lens.

Another feature of the present invention is to provide an exposure indicating device of the above described type, in which an information transmitting member on an exchangeable lens diaphragm setting member generates information for the camera of a maximum f-number of the lens and which also serves as the mode selection operating member. The above information is used with the information of the step-difference from the minimum to the preset f-numbers to generate information of the minimum f-number, which information enables indication of an f-number corresponding to an automatically controlled aperture prior to a stopping-down operation.

Still another feature of the present invention is to provide an indicating device of the above described type, in which the information transmitting member further serves as a scale selection member for enabling either an aperture scale or a shutter speed scale to be observed within the field of view of a viewfinder.

The indicating device of the present invention is used in a single lens reflex camera which is selectively settable to an automatic aperture control mode or to an automatic shutter speed control mode. An exchangeable lens is mountable on the camera body and includes a diaphragm and an objective lens. The camera includes first and second information receiving members, and indicating means having a pair of input terminals and being capable of providing an indication in accordance with the difference between signals at the pair of input terminals. The exchangeable lens is provided with aperture setting means settable to any one of a number of manually set aperture positions and to an automatic aperture control position. First and second information transmitting members are provided on the aperture setting means in such a relationship that the first information transmitting member transmits to the first information receiving member information of the step-difference from a minimum to a set f-number of the exchangeable lens independently of the set position of the aperture setting means. The second information transmitting member transmits to the second information receiving member information of a maximum f-number of the exchangeable lens only when the aperture setting means is set to the automatic aperture control position.

Additionally, circuitry is provided to generate exposure factor signals. A first signal is representative of the first information; a second signal is representative of information of the minimum f-number obtained by composing the first and second information; a third signal is representative of the selected shutter speed; a fourth signal is representative of the set film sensitivity and the object light intensity, which has passed through the objective lens and the aperture formed by the diaphragm; and a fifth signal is a given reference signal.

Furthermore, the invention includes switch means capable of being coupled with the second information transmitting member through the second information receiving member. By that coupling, the switch means sets the camera to the automatic aperture control mode and transmits the difference between the second and fourth signals and the third signal to the input terminals of the indicating means when the aperture setting means is set to the automatic aperture control position. The switch means sets the camera to the automatic shutter speed control mode and transmits the difference between the first and fourth signals and the fifth signal to the input terminals of the indicating device when the aperture setting means is set to any one of the manually set aperture positions.

With the above structure, the aperture is automatically controlled and an f-number corresponding to the automatically controlled aperture is indicated prior to a stopping-down operation, i.e., with the aperture maintained fully open when the aperture setting means is set to the automatic aperture control position, and the shutter speed is automatically controlled. That automatically controlled shutter speed is indicated prior to a stopping-down operation when the aperture setting means is set to any one of the manually set aperture positions. Thus, all that a camera operator must do upon changing the automatic exposure control modes is to operate the aperture setting means, which results in an improvement in operating the camera.

In a preferred embodiment according to the present invention, the indicating device is further provided with a viewfinder, a scale member bearing thereon an f-number scale and a shutter speed scale, and scale switch means. The scale switch means is capable of being coupled with the second information transmitting member through the second information receiving member, and moves the scale member so that the f-number scale is observed within the field of view of the viewfinder when the aperture setting means is set to the automatic aperture control position. The scale switch means also functions so that the shutter speed scale is observed within the field of view of the viewfinder when the aperture setting means is set to any one of the manually set aperture positions. The indicating means is disposed within the viewfinder, so that indication thereof is viewed within the field of view of the viewfinder together with either one of the scales, which shows the exposure factor to be automatically controlled at that time upon the setting of the aperture setting means.

The above advantages, objects and features of the present invention will become more apparent from the following description taken in connection with the accompanying drawings.

DESCRIPTION OF THE PREFERRED EMBODIMENTS

Figure 1:
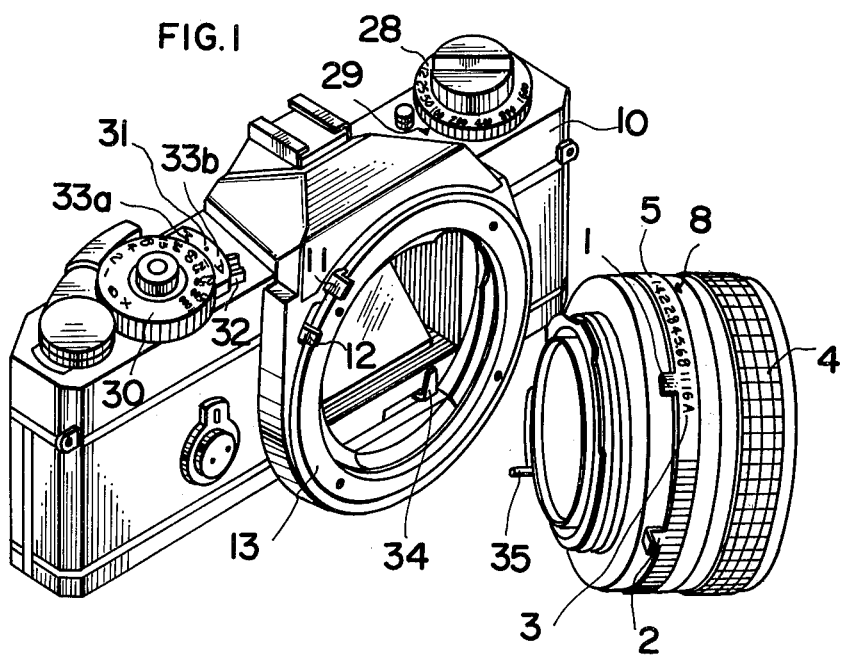
FIG. 1 is a perspective view illustrative of an embodiment of the present invention, showing an exchangeable lens and a camera body of a single lens reflex camera in confronting relation to each other.

Prior to the description of preferred embodiments of the present invention, the principles of operation incorporated in the present invention are as follows.

According to the APEX notation system, assume index symbols for use in photographic and computing formulae, as follows: Bv for a luminance value, Sv for a film speed value, Av for an aperture value, and Tv for a time value. As is well known, a proper exposure condition is given as follows:

$$Sv + Bv = Tv + Av$$

In a lens-exchangeable, automatic TTL light-measurement camera, a fully open light measuring system is adopted, in which object light which has passed through a fully open diaphragm aperture at an aperture value Avo is received by a light measuring element. In this case, an output Bvo of the light receiving element is used as a basis of automatic exposure computation, wherein $Bvo = Bv - Avo$.

Accordingly, a general type diaphragm-priority-automatic-shutter-speed exposure control device adopts either one of the following formulae which are modifications of the formula above:

$$Tv = Sv + (Bv - Avo) - Av + Avo = (Sv + Bvo) - Av + Avo \quad \text{(I)}$$

$$Tv = Sv + (Bv - Avo) - (Av - Avo) = (Sv + Bvo) - P \quad \text{(II)}$$

In the exposure control type which adopts the formula (I), two signals respectively representing a preset aperture value and a fully open aperture value Avo are transmitted from the exchangeable lens to the camera body. In contradistinction thereto, in the type which adopts the formula (II), the diaphragm information, such as the difference in step (P) between a preset aperture value (a preset f-number) and a fully open aperture value (a minimum f-number), i.e. only the rotational displacement of the diaphragm setting ring of the exchangeable lens is transmitted. That is, in the exposure control type which adopts the formula (II), only a single signal is transmitted.

Therefore, a comparison of the above two types of diaphragm-priority-automatic-shutter speed control devices using formulas (I) and (II), respectively, indicates that in the exposure control type adopting the formula (II), only a single signal (P) is transmitted, and thus the manufacturing cost of the exchangeable lens is less. However, this consideration is applicable only to a camera of the diaphragm-priority-automatic-shutter-speed control type.

In contrast thereto, in designing a camera which allows shutter-speed-priority-automatic-diaphragm control, as well, and adopts only the formula (I), that formula should be modified as follows:

$$Av = (Sv + Bvo - Tv) + Avo \qquad (III)$$

So that the camera can carry out automatic diaphragm control, the proper aperture value to be controlled prior to the commencement of the stopping-down operation, and indication of the f-number corresponding to the proper aperture value, in accordance with the above automatic computing formula, must be computed. A camera adopting the formula (II) cannot compute a proper aperture value for diaphragm automatic control and indicate an f-number corresponding to a proper aperture value, before the stopping-down operation commences.

The aforesaid objects of the present invention may be attained by a combination of an exchangeable lens adopting the formula (II) and a camera, with the addition of a special concept according to the present invention, whereby a signal representing the difference in step P between a minimum f-number and a preset f-number can be applied for automatic diaphragm control, thereby providing a low cost, reasonable information transmission system for indication of an f-number.

The aforesaid concept is based on the discovery that: (i) prior to the commencement of the stopping-down of the diaphragm, a proper aperture value for an automatic diaphragm control mode is calculated, based on the formula Avo=Av−P which is obtained from the relationship P=Av−Avo. A corresponding f-number is indicated, by setting the diaphragm setting ring of an exchangeable lens to a specific position, without providing a member for directly transmitting a signal representing a minimum f-number of the exchangeable lens to the camera body. (ii) The specific set position of the diaphragm setting ring is computed in terms of the preset f-number, and a rotational displacement of the diaphragm setting ring is determined. (iii) The information of the values thus obtained is substituted for Av and P, and become Avc and Pc. Avo is indirectly transmitted to the camera body, so that a proper aperture value may be computed according to the following formula:

$$Av = (Sv + Bvo - Tv) + Avc - Pc \qquad (IV)$$

Figure 4:
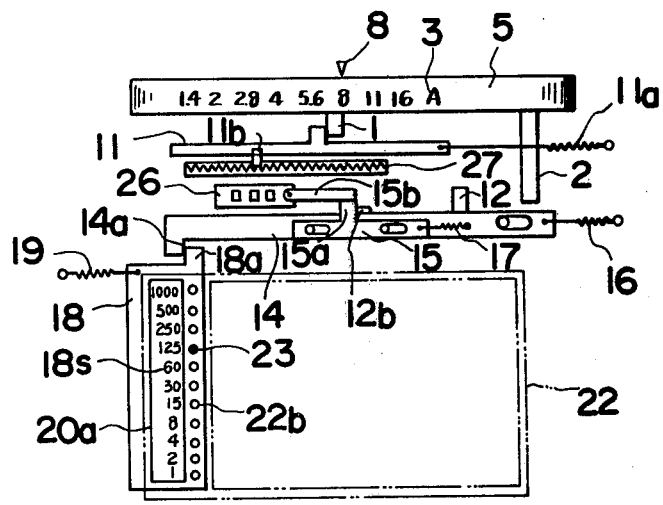
FIGS. 4 and 5 are developed views of first and second information transmitting systems of the embodiment and showing plan views of the field of view of a viewfinder, when the camera is set to the automatic shutter speed control mode as in FIG. 3, and when the camera is set to the automatic aperture control mode as in FIG. 2.
Figure 5:
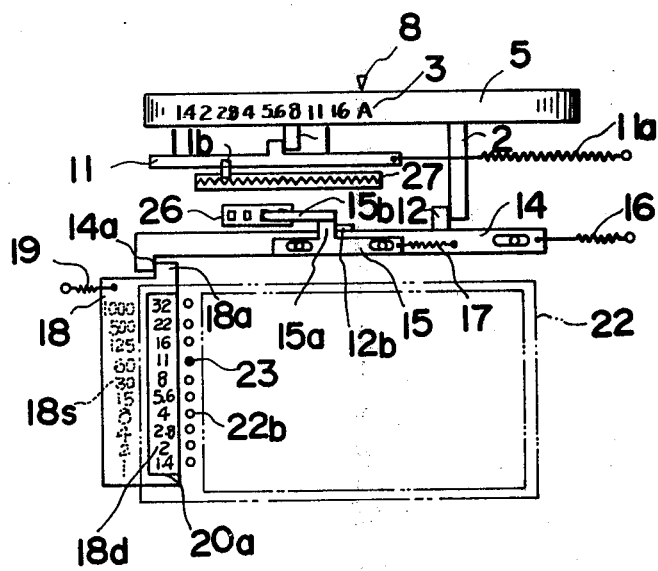
Figure 6:
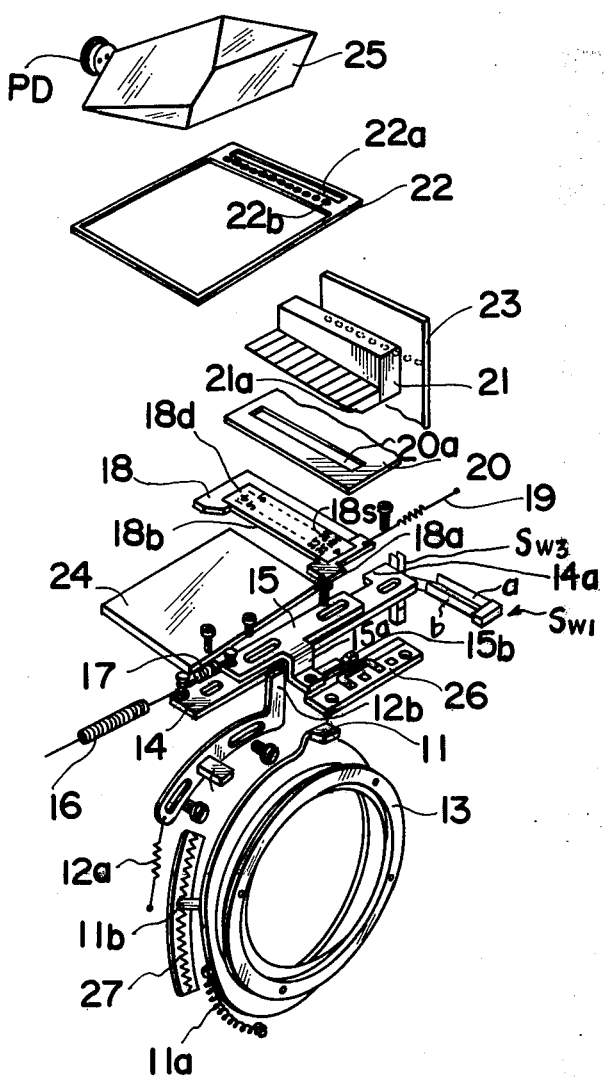
FIG. 6 is an exploded perspective view of essential elements of the indicating device.

FIG. 1 is a perspective view of camera body 10, in accordance with the present invention, and exchangeable lens 4, which are separated and disposed in confronting relation to each other. Provided on the peripheral portion of bayonet ring 13 on camera body 10 is first receiving member 11, similar to that of a prior art camera body, which is biased to rotate counterclockwise under the action of spring 11a, as seen in FIGS. 4 through 6. First receiving member 11 is adapted to engage first transmitting member 1 projecting from diaphragm setting member (diaphragm setting ring) 5 when exchangeable lens 4 is mounted on camera body 10, diaphragm setting ring 5 being manually rotatable relative to exchangeable lens 4. First receiving member 11, through engagement with first transmitting member 1, is rotated by a difference in the number of steps to be stopped-down from a minimum f-number and a preset f-number, so that brush 11b on first receiving member 11 slides along the resistance of potentiometer 27, thereby determining a value of resistance. Briefly, information representing a difference in the number of steps to be stopped-down from a minimum f-number to a preset f-number in exchangeable lens 4 is transmitted, by a first transmitting system consisting of a first transmitting member 1 and a first receiving member 11, to camera body 10 as a resistance value on potentiometer 27.

Figure 2:
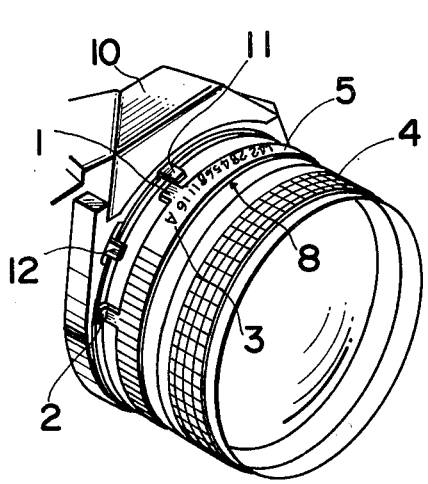
FIGS. 2 and 3 are respective perspective views showing the exchangeable lens mounted on the camera body, with a diaphragm setting ring set to F:5:6 in FIG. 2; and to an automatic aperture control mark "A" in FIG. 3.
Figure 3:
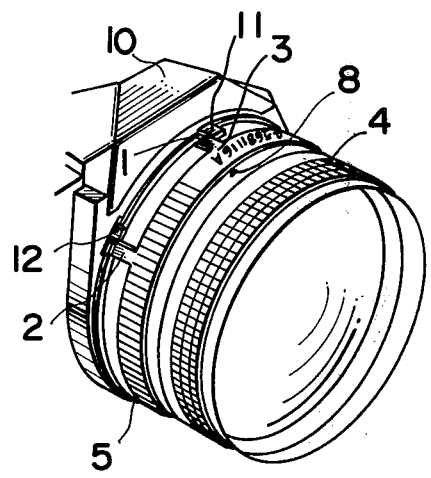

A second receiving member 12 is provided on the peripheral portion of bayonet ring 13, which is biased to rotate counterclockwise under the action of spring 12a and is rotatable along the periphery of bayonet ring 13. Second receiving member 12 is engageable with second transmitting member 2 projecting from diaphragm setting member 5, thereby constituting a second transmitting system. Diaphragm setting ring 5 has automatic diaphragm control index 3 marked at a point spaced a distance corresponding to a predetermined steps from the maximum f-number. The engagement between the two members constituting the second transmitting system is provided only when automatic diaphragm control index 3 is set to index 8 on exchangeable lens, as best seen in FIG. 4. Second transmitting member 2 transmits information of the maximum f-number (F16 in FIGS. 1–3) on exchangeable lens 4 to camera body 10. The transmission of the information of the maximum f-number is achieved by providing a distance (a space or angular difference) between automatic diaphragm control index 3 and second transmitting member 2 on diaphragm setting ring 5, as is described in co-pending application Ser. No. 769,832, filed Feb. 17, 1977 and assigned to the same Assignee as the present invention. In the shutter speed automatic control mode, second receiving member 12 is urged by spring 12a to a terminal stop point as shown in FIGS. 3 and 4. However, in the diaphragm automatic control mode, the second receiving member 12 is urged clockwise by second transmitting member 2 on exchangeable lens 4, as seen in FIGS. 2 and 5. If second receiving member 12 is urged clockwise by one step as shown in FIG. 3, the information that a maximum f-number on exchangeable lens 4 is F16 is transmitted to camera body 10; if second receiving member 12 is moved clockwise by two steps, the information that a maximum f-number of F22 on the exchangeable lens is transmitted to camera body 10, and in case of three steps of clockwise movement, the information that a maximum f-number of F32 on the exchangeable lens is transmitted to camera body 10. Simultaneously with the above transmission, first transmitting member 1 transmits to camera body 10 the difference in steps between a minimum f-number and a maximum f-number plus a difference in step $\alpha$. The value $\alpha$ is equivalent to the difference in distance from the maximum f-number to automatic diaphragm control index 3. Although each exchangeable lens has a different maximum f-number, the value α is constant for every type of exchangeable lens regardless of the maximum f-number. However, for each exchangeable lens the distance from automatic diaphragm control index 3 to the second transmitting member is different. That is, for each exchangeable lens the shifting distance of the second transmitter member is different.

FIG. 1 shows film sensitivity graduations 28 and index 29 therefor, shutter speed selecting dial 30 and index 31 therefor, manual and automatic exposure control modes selecting member 32 and indexes 33a, 33b therefor, automatic diaphragm stopping-down member 34, and diaphragm actuating pin 35 provided on exchangeable lens 4, which cooperates with automatic diaphragm stopping-down member 34. Exposure control modes selecting member 32 should be set to index 33a ("M") for manual exposure control and to index 33b ("A") for automatic diaphragm control and automatic shutter speed control modes of operation.

FIG. 2 depicts an exchangeable lens barrel mounted on the camera body, in which an f-number is preferentially determined as F5.6 in the automatic shutter speed control mode. FIG. 3 shows an exchangeable lens barrel, in which diaphragm automatic control index 3 (A) is set to index 8 in the automatic diaphragm control mode. FIG. 4 is a developed view of both transmitting systems in the diaphragm-priority-automatic-shutter-speed-control mode, also showing an indicator in the viewfinder, wherein an f-number is preferentially determined as F8. FIG. 5 is a developed view of both transmitting systems in the shutter-speed-priority-automatic-diaphragm-control mode, showing the indicator in the viewfinder. FIG. 6 is an exploded, perspective view of the essential mechanical components of the transmission and indicating system of the invention.

Referring to the changing-over operation between two automatic exposure modes as well as the change-over of the respective indicator associated therewith, second receiving member 12 is normally biased counter-clockwise along the periphery of bayonet ring 13 by spring 12a, and is maintained at the terminal stop point, as previously described. That position of second receiving member 12 indicates that an exposure control mode other than the shutter-speed-priority-automatic-diaphragm-control mode is selected.

Slide plate 14 and contacting change-over plate 15 constitute a double lever and are normally biased by springs 16 and 17, respectively, such that projection 15a of contacting change-over plate 15 is normally maintained in engaging relation to projection 12b of second receiving member 12. Contacting member 15b, rigidly fixed to contacting change-over plate 15, is selectively connected to one or more of the contacts on stationary contactor 26 in association with the movement of contacting change-over plate 15, the aforesaid plurality of contacts on stationary contactor 26 being provided for information of a maximum f-number on the exchangeable lens (F:16 in this embodiment). Contacting member 15b also provides information of the compensation for a one step excessive setting of diaphragm setting member 5 with automatic diaphragm control. Switches SW1 and SW3 are actuated by slide plate 14, and enable selection of exposure indications and selection of automatic exposure control modes, respectively, as hereinafter described in more detail in connection with FIG. 7.

Scale change-over plate 18, having projection 18a engageable with projection 14a projecting from one end of slide plate 14, is normally biased by spring 19 such that both projections 14a and 18a are usually maintained in engaging relation with each other. Scale change-over plate 18 includes indication plate 18b movable between focussing plate 24 and pentagonal prism 25 according to the exposure control mode selected. Pentagonal prism 25 constitutes the viewfinder. Indication plate 18b has shutter speed graduations 18s and diaphragm graduations 18d on the surface thereof which are arranged so that, according to the shift of indication plate 18b, either graduations 18s or 18d may be seen in the finder view field through the medium of graduation regulating frame 20, light guide 21 and openings 22a provided in image plane regulating mask 22. Frame 20, light guide 21 and mask 22 are placed one upon another. Light from light emitting diodes 23 opposite light guide 21 is substantially fully reflected by reflection surface 21a of light guide 21, then oriented upwards through opening 22b provided in part of image plane regulating mask 22, and eventually indicated within the finder, as shown in FIGS. 4 and 5.

In both the shutter speed automatic control mode and the automatic diaphragm control mode, a shutter speed to be controlled and an f-number corresponding to an aperture value to be controlled are indicated in the manner shown in FIGS. 4 and 5, respectively. More specifically, if diaphragm setting member 5 on exchangeable lens 4 is turned such that automatic diaphragm control index 3 is set to index 8 as seen in FIGS. 3 and 5, second receiving member 12 is urged clockwise as viewed in FIG. 3 (leftwards as viewed in FIG. 5) by engagement with second transmitting member 2, whereby slide plate 14 is shifted leftwards (in FIG. 5) against the force of spring 16 through the medium of contacting change-over plate 15. As a result, scale change-over plate 18, having projection 18a maintained in engagement with projection 14a of slide plate 14, is urged leftwards by the force of spring 19 connected to the plate 18 itself, so that diaphragm graduations 18d can be seen in the finder through opening 20a provided in graduation regulating frame 20 and opening 22a in image plane regulating frame 22.

The following is a detailed description of the transmission of diaphragm information to the camera body. Referring first to the shutter-speed-priority-automatic-diaphragm-control mode, manual and automatic exposure control modes selecting member 32 is set to index 33b. Then diaphragm setting member 5 on exchangeable lens 4 is first turned to set diaphragm automatic control index 3 to index 8, so that first receiving member 11 is shifted by first transmitting member 1 a distance corresponding to a difference in the number of steps to be stopped-down from a minimum f-number to a maximum f-number on exchangeable lens 4, and a difference in steps (distance) from a maximum f-number to automatic control index 3. Assume, for example in FIG. 5, that automatic diaphragm control index 3 is at a point stopped-down by a single step from a maximum f-number F16. In this instance, camera body 10 usually has received aperture stopping-down exceeding by one step the actually settable maximum f-number F16, and the resistance of potentiometer 27, for controlling the diaphragm, is therefore set in error by one step. Thus, an error results in the voltage corresponding to the aforesaid difference in steps to be stopped-down which has been obtained through the medium of first transmitting member 1. Compensation for the aforesaid voltage error is achieved by compensation circuitry, to be more fully described with respect to FIG. 7.

Second receiving member 12 is shifted according to a maximum f-number for each exchangeable lens, so that a resistance value is selected commensurate with the maximum f-number of the exchangeable lens used, thereby producing a voltage corresponding to the value of the maximum f-number. A voltage corresponding to a minimum f-number is obtained by deducting the voltage corresponding to a maximum f-number from a voltage corresponding to a difference in steps to be stopped-down which has been obtained through movement of the first transmitting member 1.

Continuing with the shutter-speed-priority-automatic diaphragm control mode, since the shutter speed is preferentially set, a predetermined one of light emitting diodes 23 is energized according to the difference between a voltage corresponding to the set shutter speed and a voltage obtained by deducting the aforesaid voltage commensurate with the minimum f-number from the sum of voltages obtained by adding the voltage corresponding to the set film sensitivity and to the light measuring voltage from a light measuring circuit.

The sum of the light measuring voltage and a voltage corresponding to the set film sensitivity, and a voltage obtained by deducting the aforesaid voltage corresponding to the number of steps to be stopped-down, obtained by first transmitting member 1, from the sum of the voltages, are respectively fed as inputs to the separate circuitry for comparison with a voltage corresponding to the set shutter speed. Thereby, according to the difference between the voltages to be compared with one another, individual light emitting diodes provided for indicating an out-of-interlocking condition are energized. Stated differently, if the sum of the light measuring voltage and the voltage corresponding to the set film sensitivity is higher than the voltage corresponding to set shutter speed, an underexposure results at the set shutter speed even if the diaphragm to be controlled is maintained in the minimum aperture condition. This is indicated by energization of one of the light emitting diodes for indication of the out-of-interlocking condition. If the voltage obtained by deducting the aforesaid voltage, corresponding to the number of steps to be stopped-down, from the sum of the light measuring voltage and the voltage corresponding to the set film sensitivity is lower than the voltage corresponding to the set shutter speed, then overexposure results at the set shutter speed, even if the diaphragm is stopped-down to an aperture corresponding to a maximum f-number. This is indicated by energization of another light emitting diode for indication of the out-of-interlocking condition. In this connection, the provision of an indication window with an arrow-mark contour allowing passage of light from the corresponding light emitting diode is preferable, so that the exposure condition, such as "underexposure" or "overexposure" is indicated according to the direction of the illuminated arrow.

The following is a description of the operation of the diaphragm-priority-automatic-shutter-speed-control mode. In that exposure control mode, diaphragm setting member 5 on exchangeable lens 4 is manually set to a desired f-number beforehand with mode selecting member 32 set to index 33b.

Where the f-number is preset, first transmitting member 1 and first receiving member 11 are maintained in engaging relation to each other, thereby establishing the first transmitting system. However, second transmitting member 2 and second receiving member 12 remain disengaged. The engagement of the first transmission system allows the transmission of information corresponding to the difference in the number of steps to be stopped-down from a minimum f-number to a set f-number from exchange lens 4 to camera body 10. Yet, the second transmission system remains disengaged, so that second receiving member 12 is maintained in a stationary position under the force of spring 12a.

A voltage corresponding to the set film sensitivity is added to a light measuring voltage, and a voltage corresponding to the difference in the number of steps to be stopped-down, which is obtained through first receiving member 11, is deducted from the voltage obtained by the above addition. According to the difference between the resultant voltage and a given reference voltage for use for automatic shutter speed control, a corresponding one of light emitting diodes 23 is energized.

Thus, either in the automatic shutter speed control mode, or the automatic diaphragm control mode, the indication of the shutter speed to be controlled is achieved prior to the commencement of the stopping-down operation.

DESCRIPTION OF FIG. 7

Figure 7:
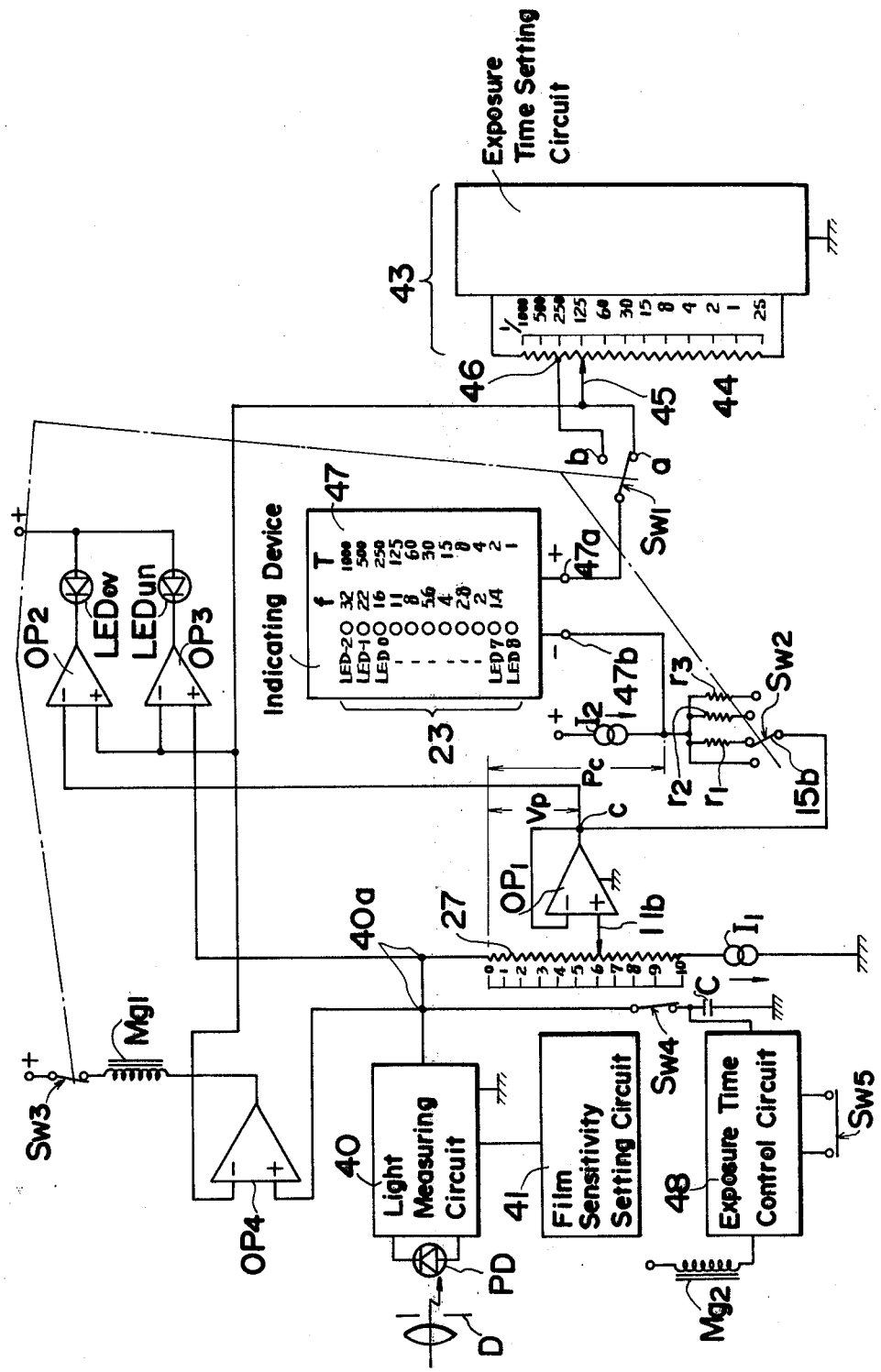
FIG. 7 is a combined schematic and block diagram of an automatic exposure control system and an exposure indicating system for the invention.

An explanation of the selection of either one of the automatic exposure control modes and of the operation of the exposure indication follows in more detail with reference to FIG. 7, which schematically illustrates an automatic exposure control system and an exposure indicating system adaptable to the embodiment shown in FIGS. 1 to 6. To avoid cluttering the drawing, a circuit which enables a manual exposure control mode when manual and automatic exposure control modes selecting member 32 is set to index 33a "M", is omitted from FIG. 7 since such a circuit is well known in the art.

Light measuring circuit 40 includes a photosensitive element PD disposed to receive object light which has passed through an objective lens and an aperture formed by diaphragm D of the enchangeable lens, and generates a voltage proportional to the logarithm of the intensity of the light thus received. To this voltage is added a voltage representative of film sensitivity setting, which is generated by a film sensitivity setting circuit 41, so that circuit 40 generates, at its output terminal 40a, a voltage signal Vt corresponding to the intensity of the light received by photosensitive element PD and the film sensitivity setting. Potentiometer 27 and constant current source I1 constitute a first signal generating means.

According to the APEX notation, voltage signal Vt corresponds to Tvo in the case of fully open aperture light measurement, wherein $Tvo = Bv + Sv - Avo$, in which Avo represents a fully open aperture value, and Tvo represents a time value for the fully open aperture. Voltage signal Vt varies by a given voltage Va for a change which corresponds to one step of the APEX index.

One end of variable resistor 27, having a linear resistance characteristic, is connected to output terminal 40a, and the other end of resistor 27 is connected to a constant current source $I_1$. A voltage shifted down from the voltage level at output terminal 40a by a voltage $V_p$, commensurate with the amount of the rotational displacement of diaphragm setting member 5, is derived through sliding element 11b adapted to be slid on resistor 27 in response to the rotation of member 5. An operational impedance transformation amplifier $OP_1$ generates at a voltage at junction c of the same voltage as that at sliding element 11b.

Resistors $r_1$, $r_2$ and $r_3$ are arranged in parallel with each other and each resistor has one end connected to a constant current source $I_2$ and another end connected to the corresponding contact on plate 16. Contact piece 15b of switch $Sw_2$, which is connected to junction c, selects either of the contacts connected to resistors $r_1$, $r_2$ and $r_3$, in accordance with a maximum f-number of the exchangeable lens mounted on camera body 10. Resistors $r_1$, $r_2$ and $r_3$ have such resistance that they introduce into the circuit information of the compensation for the one step excessive setting of diaphragm setting member 5 in the automatic aperture control mode as well as information of the step-difference between a reference f-number (F:16 in this embodiment) and a maximum f-number of the exchangeable lens mounted on camera body 10. That is, with an exchangeable lens having a maximum f-number F:16, resistor $r_1$ is selected to shift up the voltage level at junction c by 1Va; with an exchangeable lens having a maximum f-number F:22 resistor $r_2$ is selected to shift up the same voltage level by 2Va; and further, with an exchangeable lens having a maximum f-number F:32, resistor $r_3$ is selected to shift up the same voltage level by 3Va. Also in parallel with these resistors a short-circuit is connected to the fourth contact on plate 16, and contact 15b selects this fourth contact when diaphragm setting member 5 is set to any one of the manually set aperture positions wherein any one of the f-numbers is registered with index 8. Resistors r1, r2, r3, movable switch contact 15b, operational amplifier OP1, potentiometer 27 and constant current sources I1 and I2 constitute a second signal generating means.

Exposure time setting circuit 43 generates a voltage representative of the shutter speed manually set by shutter speed dial 30. Variable resistor 44, included in circuit 43, is arranged so that constant current flows therethrough. Sliding element 45 is slid on resistor 44 in response to the setting of shutter speed dial 30, and a voltage corresponding to the selected shutter speed is derived through sliding element 45. Variable resistor 44 and sliding element 45 constitute a third signal generating means. Also through terminal 46 on resistor 44 a reference voltage is derived corresponding to an exposure time of 1/250 second. Variable resistor 44 and fixed contact 46 constitute a fifth signal generating means. Change-over switch $Sw_1$ is associated with sliding plate 14 as shown in FIG. 6, so as to be in contact with contact b connected to terminal 46, when sliding plate 14 is in its left position as in FIG. 6, in which diaphragm setting member 5 is set to any one of the manually set aperture positions. Change-over switch $Sw_1$ is switched to contact a, connected to sliding element 45, when sliding plate 14 is moved to the right as viewed in FIG. 6 in response to the setting of diaphragm setting member 5 to the automatic diaphragm control position.

Indicating device 47 is adapted to energize light emitting diodes LED-2, LED-1, — and LED 8 respectively when the difference in the voltages at its input terminals 47a and 47b is —2Va, —Va, — and 8Va, respectively. Alternatively, in place of light emitting diodes LED-2, LED-1, — and LED 8, a meter may be used, in which the position of a light emitting diode corresponding to the aforesaid voltage difference may be indicated by its pointer. Indicating device 47 using light emitting diodes LED-2, LED-1, — and LED 8 is an equivalent of a meter in principle.

Operational amplifiers $OP_2$ and $OP_3$ constitute differential amplifiers and have output terminals connected to light emitting diodes LEDov and LEDun, respectively. The negative and positive input terminals of operational amplifier $OP_2$ are connected to junction c and to sliding element 45 respectively, so as to generate a low output level when the voltage at its positive input terminal is lower than the voltage at its negative input terminal, thereby energizing light emitting diode LEDov. In contrast thereto, the negative and positive input terminals of operational amplifier $OP_3$ are connected to sliding element 45 and to output terminal 40a of light measuring circuit 40, respectively, so as to generate a low output level when the voltage at its negative terminal is higher than the voltage at its positive terminal, thereby energizing light emitting diode LEDun.

An input terminal of exposure control circuit 48 is connected to the positive terminal of memory capacitor C, which is in turn connectable to output terminal 40a of light measuring circuit 40 through memory switch $Sw_4$. As is well known in the art, memory switch $Sw_4$ is normally closed to charge memory capacitor C to the voltage level corresponding to that at terminal 40a, and is opened to disconnect memory capacitor C from light measuring circuit 40 immediately before a mirror of the single lens reflex camera is moved up to its picture taking position from its image viewing position. Exposure time control circuit 48 is actuated when count switch $Sw_5$ is closed in association with the opening of the shutter and, then energizes an electromagnet $Mg_2$ after a lapse of time from the closing of switch $Sw_5$ corresponding to the voltage stored in memory capacitor C. The energization of electromagnet $Mg_2$ causes the shutter to close, whereby an exposure is terminated.

Operational amplifier $OP_4$ constitutes a differential amplifier and serves as an automatic aperture control circuit. Operational amplifier $OP_4$ has a positive and a negative input terminal respectively connected to output terminal 40a of light measuring circuit 40 and to sliding element 45; and an output terminal connected to electromagnet $Mg_1$ and is adapted to energize that electromagnet when the voltage at its negative input terminal becomes equal to or lower than the voltage at its positive input terminal. The energization of electromagnet $Mg_1$ causes a locking member (not shown) to interrupt the stopping-down operation of diaphragm D, thereby determining an aperture formed thereby. Switch $Sw_3$, connected in series to electromagnet $Mg_1$, is associated with sliding plate 14 as shown in FIG. 6, to be opened when sliding plate 14 is in its left position as in FIG. 6 and to be closed when sliding plate 14 is moved to the right as viewed in FIG. 6. Thus, switches $Sw_1$, $Sw_3$ and $Sw_2$, the latter being constituted by contact piece 15b and the contacts on plate 16, are interconnected with the selection of either one of the automatic exposure control modes by means of diaphragm setting member 5.

The operation of the circuit shown in FIG. 7 is as follows.

At the outset, upon selection of the automatic aperture control mode with diaphragm setting member 5 set to the automatic aperture control position, shutter speed dial 30 is set to select a desired shutter speed, so that sliding element 45 sets the resistance of resistor 44 to the value corresponding to the selected shutter speed. Additionally, switch $Sw_1$ is connected to contact a, and switch $Sw_3$ is closed. Furthermore, assume that an exchangeable lens having a minimum f-number F:1.4 and a maximum f-number F:16 is mounted on camera body 10. Then, movable contact 15b of switch $Sw_2$ selects the contact connected to resistor $r_1$.

In this case, if the voltage at input terminals 47a of indicating device 47 and the voltage generated at output terminal 40a of light measuring circuit 40 with the diaphragm aperture maintained fully open are equal to one another, one of light emitting diodes LED-2, LED-1, — and LED 8 corresponding to F:1.4 should be energized. Although there are 8 steps from F:1.4 to the automatic aperture control mark 3, a voltage which is lower than that at terminal 40a by 7 Va is fed to another input terminal 47b of indicating device 47 because resistor $r_1$ provides information of one step exceeding the setting of diaphragm setting member 5. That is, the difference between the voltages fed to input terminals 47a and 47b of indicating device 47 is 7 Va and thus light emitting diode LED 7 is energized to indicate f-number F:1.4. Then, when the shutter speed to be selected thereafter is changed so that the voltage fed to input terminal 47a decreases by n Va, the difference in the voltages fed to input terminals 47a and 47b becomes (7−n)Va, and thus light emitting diode LED7−n is energized to indicate that f-number providing an optimum exposure at the selected shutter speed.

Alternatively, assume that an exchangeable lens having a minimum f-number F:2.8 and a maximum f-number F:22 is mounted on camera body 10. In this case, movable contact 15b of switch $Sw_2$ selects the contact connected to resistor $r_2$. Although there are 7 steps from F:2.8 to the automatic aperture control mark 3, a voltage which is lower by 5 Va than that at terminal 40a is fed to input terminal 47b of indicating device 47 because resistor $r_2$ gives information of the one step excessive setting of diaphragm setting member 5 and information of one step difference between a reference f-number F:16 and the maximum f-number F:22. That is, the difference in the voltages fed to input terminals 47a and 47b is 5Va if the voltage fed to input terminal 47a and the voltage generated at output terminal 40a are equal to one another, and thus light emitting diode LED5 is energized to indicate f-number F:2.8. Then, when the shutter speed to be selected thereafter is changed so that the voltage fed to input terminal 47a decreases by n Va, the difference in the voltages fed to input terminals 47a and 47b becomes (5−n) Va, and thus light emitting diode LED5−n is energized to indicate that f-number providing an optimum exposure at the selected shutter speed.

In other cases where an exchangeable lens having a maximum and a minimum f-number different from the above cases is mounted on a camera body, the indicating device of the present invention operates in the same manner as described above.

The above description provides explanations of f-number indication when diaphragm D can be controlled within the possible aperture range of an exchangeable lens mounted on camera body 10. However, there may be cases where (a) the brightness of an object is so bright that an overexposure results at the selected shutter speed even when diaphragm D is stopped-down to its minimum aperture corresponding to a maximum f-number of the exchangeable lens, and (b) where the brightness of an object is so dark that an underexposure results at the selected shutter speed even when diaphragm D is maintained at its fully open aperture corresponding to a minimum f-number of the exchangeable lens. In these cases, light emitting diodes LEDov and LEDun are energized respectively with the circuit arrangement in FIG. 7. That is, in case (a), the voltage appearing at junction c becomes higher than that appearing at sliding element 45, so that operational amplifier $OP_2$ generates a low output level, thereby energizing light emitting diode LEDov. In case (b), the voltage appearing at output terminal 40a is lower than that appearing at sliding element 45, so that operational amplifier $OP_3$ generates a low output level, thereby energizing light emitting diode LEDun.

In the automatic aperture control mode, an exposure is controlled in the following manner. Due to a shutter release operation, diaphragm D commences to be stopped-down and the voltage generated at output terminal 40a of light measuring circuit 40 decreases as the stopping-down of diaphragm D advances. Then, if the voltage generated at output terminal 40a reaches the same level as the voltage appearing at sliding element 45, operational amplifier $OP_4$ generates a low output level to energize electromagnet $Mg_1$, and thus the stopping-down operation of diaphragm D is interrupted to determine the aperture. As memory switch $Sw_4$ is still closed at this time, a voltage including the information of the aperture thus determined as well as the information of the brightness of an object and the set film sensitivity is stored by memory capacitor C. Immediately before the mirror of the camera is moved to its picture taking position, subsequent to the determination of the aperture, switch $Sw_4$ is opened, and thereafter the shutter commences to be opened. Then, count switch $Sw_5$ is closed to actuate exposure time control circuit 48. After a lapse of time from the closing of switch $Sw_5$, corresponding to the voltage stored in memory capacitor C, exposure time control circuit 48 generates an output to energize electromagnet $Mg_2$, whereby an exposure is terminated.

In the above case, if the object brightness is so bright that the voltage appearing at output terminal 40a is higher than that appearing at sliding element 45 before the commencement of the stopping-down of diaphragm D, electromagnet $Mg_1$ is energized to maintain diaphragm D at its fully open aperture. Thus, an exposure will be effected at an exposure time which is faster than the selected exposure time, if the selected exposure time cannot provide an optimum exposure at the fully open aperture.

Next, upon selection of the automatic shutter speed control mode with diaphragm setting member 5 set to any one of the manually set aperture positions, switch $Sw_1$ is connected to contact b, switch $Sw_3$ is opened, and movable contact 15b of switch $Sw_2$ selects the contact connected to the short-circuit, which is in turn connected in parallel with resistors $r_1$, $r_2$ and $r_3$. In this case, a reference voltage corresponding to 1/250 second is always fed to input terminal 47a of indicating device 47. Thus, when the voltage appearing at junction c and fed to another input terminal 47b of indicating device 47 corresponds to 1/250 second, the difference in the voltages fed to input terminals 47a and 47b becomes zero, so that light emitting diode LED0 is energized to indicate shutter speed 1/250 second. Alternatively, when the voltage corresponding to 1/500 second appears at junction c, the difference in the voltages fed to input terminals 47a and 47b is −1Va, so that light emitting diode LED-1 is energized. The voltage appearing at junction c varies in accordance with the set f- number as well as object brightness and the set film sensitivity.

In this exposure control mode, an exposure is controlled in the following manner.

In this case, electromagnet $Mg_1$ is always kept deenergized because switch $Sw_3$ is opened to interrupt the power supply to the same. Thus, automatic aperture control is disabled, and instead thereof, an aperture determining means (not shown) controls diaphragm D to the set aperture. After the determination of the set aperture, a voltage including the information of the set aperture as well as the information of the object brightness and the set film sensitivity is stored in memory capacitor C. Immediately before the mirror is moved to its picture taking position, subsequent to the determination of the set aperture, switch $Sw_4$ is opened to disconnect memory capacitor C from light measuring circuit 40, and thereafter count switch $Sw_5$ is closed in synchronism with the opening of the shutter to actuate exposure time control circuit 48. Then, exposure time control circuit 48 energizes electromagnet $Mg_2$ after a lapse of time from the closing of switch $Sw_5$ corresponding to the voltage stored in memory capacitor C, whereby an exposure is terminated.

What is claimed is:

1. An exposure indicating device for a single lens reflex camera which is selectably settable to an automatic aperture control mode or to an automatic shutter speed control mode and the camera including first and second information receiving members, an exchangeable lens being mountable on said camera and having a diaphragm and an objective lens, and indicating means having a pair of input terminals for indicating exposure factors in accordance with the difference between the signals to said input terminals, said exposure indicating device comprising:

means for aperture setting provided on said exchangeable lens and being settable to a desired one of a plurality of manually set aperture positions and to an automatic aperture control position different from any of said manually set aperture positions;

a first information transmitting member provided on said aperture setting means and capable of being coupled with said first information receiving member independently of the set position of said aperture setting means for transmitting to said first information receiving member first information of the step-difference from a minimum to the preset f-number of said exchangeable lens;

a second information transmitting member provided on said aperture setting means and capable of being coupled with said second information receiving member only with said aperture setting means set to the automatic aperture control position for transmitting to said second information receiving member second information of a maximum f-number of said exchangeable lens;

means coupled with said first and second information receiving members for generating a first signal representative of said first information, and for combining said first and second information to generate a second signal representative of the minimum f-number of said exchangeable lens with said aperture setting means set to said automatic aperture control position;

means for generating a third signal representative of the manually selected shutter speed;

means for generating a fourth signal representative of the set film-sensitivity and the intensity of the light from an object passed through said objective lens and the aperture formed by said diaphragm, said fourth signal generating means being connected with said first and second signal generating means such that the sum of said first and fourth signals is obtained with said aperture setting means set to any one of said manually set aperture positions, and the sum of said second and fourth signals is obtained with said aperture setting means set to the automatic aperture control position, and one of said input terminals of said indicating means receiving the sum of said first and fourth signals and the sum of said second and fourth signals;

means for generating a fifth reference signal;

means coupled with said second information receiving member for selectively setting said camera to the automatic aperture control mode with said aperture setting means set to the automatic aperture control position and to the automatic shutter speed control mode with said aperture setting means set to any one of said manually set aperture positions; and means responsive to the mode selection of said camera for applying to the other input terminal of said indicating means said third signal upon selection of the automatic aperture control mode and said fifth signal upon selection of the automatic shutter speed control mode.

2. An exposure indicating device as defined in claim 1, further comprising:
   a viewfinder;
   a scale member bearing thereon an f-number scale and a shutter speed scale; and
   means coupled with said second information receiving member, for moving said scale member so that said f-number scale appears within the field of view of said viewfinder with said aperture setting means set to said automatic aperture control position and so that said shutter speed scale appears within the field of view of said viewfinder with said aperture setting means set to any one of said plurality of manually set aperture positions.

3. An exposure indicating device as defined in claim 2, wherein said indicating means is disposed in said viewfinder to be viewed adjacent to one of said scales observed within said viewfinder field of view.

4. An exposure indicating device as defined in claim 3, wherein said indicating means further includes a set of luminant elements which are selectively lit in accordance with the levels of the difference of said signals to said input terminals.

5. An exposure indicating device as defined in claim 1 further comprising means for compensating the sum of the second and fourth signals in accordance with said automatic aperture control position of said means for aperture setting, there being provided a predetermined number of steps from said automatic aperture control position to the maximum f-number setting position of said means for aperture setting.

6. An exposure indicating device as defined in claim 5 wherein said means for compensating includes a constant current source and a plurality of resistors connected to said current source, each of said resistors representing the predetermined number of steps from said automatic aperture control position to the maximum f-number setting position of said means for aperture setting, and a movable contact on said second receiving member for connection of one of said resistors in series with said one input in accordance with the movement of said second information receiving member.

7. An exposure indicating device as defined in claim 1 further comprising a constant current source and wherein said means for generating a first signal and for combining said first and second information to generate a second signal is a potentiometer serially connected with said constant current source and to said means for generating a fourth signal, and said potentiometer including a sliding terminal connected to said first receiving member.

8. An exposure indicating device as defined in claim 1 further comprising means for manually selecting a desired shutter speed comprising a potentiometer having a sliding terminal movable in accordance with the setting of said desired shutter speed and comprising said means for generating a third signal, said means for generating a fifth reference signal is a fixed terminal set at a respective position of said variable potentiometer corresponding to a given manual shutter speed setting; and said means responsive to the mode selection of the camera is a switch having a movable contact connected to said other input terminal, a first fixed contact connected to said fixed potentiometer terminal and a second fixed contact connected to said sliding potentiometer terminal.

9. An exposure indicating device as defined in claim 8 wherein said switch is actuated by movement of said second information receiving member.

10. A device for introducing information of a minimum f-number of an exchangeable lens to a single lens reflex camera selectively settable to either an automatic aperture control mode or an automatic shutter speed control mode and wherein an automatically controlled shutter speed and an f-number corresponding to an automatically controlled aperture are both respectively indicated in the automatic shutter speed control mode and in the automatic aperture control mode, with said aperture maintained fully open, said device comprising:

means for aperture setting, provided on said exchangeable lens and being settable to a desired one of a plurality of manually set aperture positions and to an automatic aperture control position different from any of said manually set aperture positions;

first and second information receiving members provided in said camera;

a first information transmitting member provided on said aperture setting means and capable of being coupled with said first information receiving member independently of the set position of said aperture setting means for transmitting to said first information receiving member first information of the step-difference from a minimum to the set f-number of said exchangeable lens;

a second information transmitting member provided on said aperture setting means and capable of being coupled with said second information receiving member only with said aperture setting means set to the automatic aperture control position for transmitting to said second information receiving member second information of a maximum f-number of said exchangeable lens;

means associated with said first information receiving member for generating a first signal representative of said first information;

means associated with said second information receiving member for generating a second signal representative of said second information with said aperture setting means set to said automatic aperture control position;

means for combining said first and second signals for generating a third signal representative of the minimum f-number of said exchangeable lens; and means capable of being coupled with said second information receiving member for selecting the automatic aperture control mode and the automatic shutter speed control mode, respectively, with said aperture setting means set to said automatic aperture control position and with said aperture setting means set to any one of said manually set aperture positions, respectively.

* * * * *